United States Patent [19]

Frieband et al.

[11] E Re. 28,612

[45] Reissued Nov. 11, 1975

[54] DIGITAL PROCESSOR HAVING AUTOMATIC CONFLICT-RESOLVING LOGIC

[75] Inventors: Neil G. Frieband, Framingham; Douglas O. Kendrick, Northborough, both of Mass.

[73] Assignee: Incoterm Corporation, Marlboro, Mass.

[22] Filed: Jan. 28, 1974

[21] Appl. No.: 436,839

Related U.S. Patent Documents

Reissue of:

[64] Patent No.: 3,639,911
Issued: Feb. 1, 1972
Appl. No.: 45,026
Filed: June 10, 1970

[52] U.S. Cl. ..... 340/172.5
[51] Int. Cl.[2] ..... G06F 9/18
[58] Field of Search ..... 340/172.5

[56] References Cited

UNITED STATES PATENTS

| | | | |
|---|---|---|---|
| 3,226,694 | 12/1965 | Wise | 340/172.5 |
| 3,293,610 | 12/1966 | Epperson et al. | 340/172.5 |
| 3,312,951 | 4/1967 | Hertz | 340/172.5 |

*Primary Examiner*—Raulfe B. Zache
*Attorney, Agent, or Firm*—Kenway & Jenney

[57] ABSTRACT

A digital data process for transferring information with associated devices has an automatically operating executive, i.e., conflict-resolving, logic unit that resolves operating conflicts arising from the asynchronous operations of the processor and the associated devices when one calls for an information transfer with the other. The processor operates under control of the logic unit to store off interrupted status at and load in new status information from memory locations dedicated to this purpose and identified, at least in part, by the particular device with which the processor is operating.

17 Claims, 6 Drawing Figures

INVENTORS
NEIL G. FRIEBAND
DOUGLAS O. KENDRICK
BY
Kenway, Jenney & Hildreth
ATTORNEYS

INVENTORS
NEIL G. FRIEBAND
DOUGLAS O. KENDRICK

BY Kenway, Jenney & Hildreth
ATTORNEYS

INVENTORS
NEIL G. FRIEBAND
DOUGLAS O. KENDRICK

BY

ATTORNEYS

INVENTORS
NEIL G. FRIEBAND
DOUGLAS O. KENDRICK
BY
Kenway, Jenney & Hildreth
ATTORNEYS INVENTORS
NEIL G. FRIEBAND
DOUGLAS O. KENDRICK
BY
Kenway, Jenney & Hildreth
ATTORNEYS

DIGITAL PROCESSOR HAVING AUTOMATIC CONFLICT-RESOLVING LOGIC

Matter enclosed in heavy brackets [ ] appears in the original patent but forms no part of this reissue specification; matter printed in italics indicates the additions made by reissue.

BACKGROUND

This invention relates to an electronic digital data processor having an improved capability to transfer from operation on one program or routine to operation on another in the event an interrupting conflict situation arises. Such an "executive" operation is useful in the event the processor needs to transfer information with an associated device that is not ready for the transfer. The processor can also use the executive operation to service an interrupt request.

A typical application of the invention is in a data processor operating with plural input/output (I/O) devices. Each I/O device operates, at least part of the time, asynchronously of the processor. When the processor executes an instruction calling for a read or write operation with an I/O device, it sends an actuating signal to the specified device, as is conventional. When the device is prepared for the requested operation, it normally transmits a device-acknowledge signal to the processor within a specified time. In response, the processor proceeds with the I/O instruction.

However, in the event the processor does not receive the acknowledge signal in the alloted time, it is undesirable for the processor to halt operations and wait for it. Instead, one prior art processor jumps through a new address to an executive routine that resolves the problem caused by the absence of the device acknowledge signal. In a processor operating in this conventional manner, the address of the appropriate conflict-resolving executive routine typically is stored in the core or other memory in the next successive location after the location storing the I/O instruction. Thus such a prior processor requires two memory locations for each I/O instruction, one location to store the instruction and another location to store the address of the executive routine that will resolve the problem of what to do while awaiting the delayed device-acknowledge signal.

Another prior art solution to the problem of a delayed device-acknowledge signal is to perform all input/output instructions with an executive routine. That is, when the program being processed calls for an input-/output operation, the processor transfers operation to a I/O executive routine that performs the desired I/O transfer and resolves any interrupting conflicts that arise in the process. Such resort to an executive routine for performing I/O instructions requires even more memory locations to store the large number of executive routine instructions, than the previously mentioned prior practice.

Further processor "scheduling" problems arise when an I/O device raises an interrupt flag, i.e., sends the processor a signal requesting that the processor transfer information with the device. Again, prior art interrupt schemes generally require use of many memory locations.

The large number of memory locations which these prior art processors require to resolve delayed device acknowledge signals and like interrupting conflicts is costly. Moreover, unless more memory is provided, it restricts the processor from performing other operations that require use of many memory locations.

Accordingly, it is an object of this invention to provide a digital data processor that can transfer from operation on one program to operation on another, in the event an interrupting conflict arises, with resort to relatively few memory locations.

A further object of the invention is to provide a processor capable of providing the foregoing program-transferring operation with relatively few operating cycles and hence in relatively little time.

Another object of the invention is to provide a processor that resumes execution of a postponed I/O or other operation, such as when a delayed advice acknowledge signal arrives, with resort to only a small number of processor cycles.

Other objects of the invention will in part be obvious and will in part appear hereinafter.

SUMMARY OF THE INVENTION

A processor embodying the invention automatically resolves an interrupting conflict in a manner that requires considerably fewer memory locations than known processors currently available. Moreover, the processor requires only a small complement of logic circuits to provide this executive operation. The automatic executive operation of the invention is further characterized in that it involves no resort to stored instructions.

The automatic executive operation of the processor can resolve both an interrupting conflict that tends to delay operation, as arises from the absence of a timely device acknowledge signal, and a conflict that calls on the processor to interrupt the current program and service an external I/O or other device that has issued an interrupt request, i.e., a request for service.

An interrupting conflict situation can in general arise whenever a data processor is to exchange control signals or information with another data processing device that operates timewise independently from the processor. A conflict arises either when the processor is ready to exchange signals with the device, or vice versa, and the device or processor whichever the case may be is not ready for the transfer. Thus, the invention has application to data processing systems in general where a processor operates with such a separation device having sequence or program control independent from the processor. The invention is described here with specific reference to a processor operating with data processing input/output devices.

Stated simply, the processor operates with a processor memory element, typically a conventional core memory, in which a set of locations is dedicated to each I/O device with which the processor can operate. In an elementary instance, one such location of each set is common to a group of I/O devices and there is only one dedicated location for each I/O device plus the additional common location.

When the processor detects that an interrupting conflict situation has arisen, it automatically actuates a special sequence controlling logic unit. This logic unit arrests the normal processor operation and stores off the contents of the processor components that specify its status at the point of the interruption. The logic control unit stores the status information in a memory location dedicated to the device causing the conflict and selected in accordance with the origin or nature of the interruption. The logic control unit then loads into the status-defining components of the processor, from another memory location dedicated to the particular device and interrupt situation, the status of a program previously stored there.

Two interrupting conflict situations are discussed in detail, the absence of a timely device acknowledge signal and the recognition of an interrupt request from a device.

In the former instance, the processor status for the pending I/O instruction is stored off in a so-called device-status location in memory assigned to the designated I/O device. The processor is then set up with the status of a background program, taken from a so-called background memory location assigned to the device. This background location can be common to a group of I/O devices.

In the other situation where an interrupt is recognized, the sequence control unit automatically stores off the pending processor status in the background location assigned to the I/O device that raised the recognized interrupt request. The processor status-defining processor components from the device location assigned to the interrupting device.

BRIEF DESCRIPTION OF DRAWINGS

For a fuller description of the nature and objects of the invention, reference should be had to the following detailed description taken in connection with the accompanying drawings, in which.

DESCRIPTION OF SPECIFIC EMBODIMENTS

Figure 1:
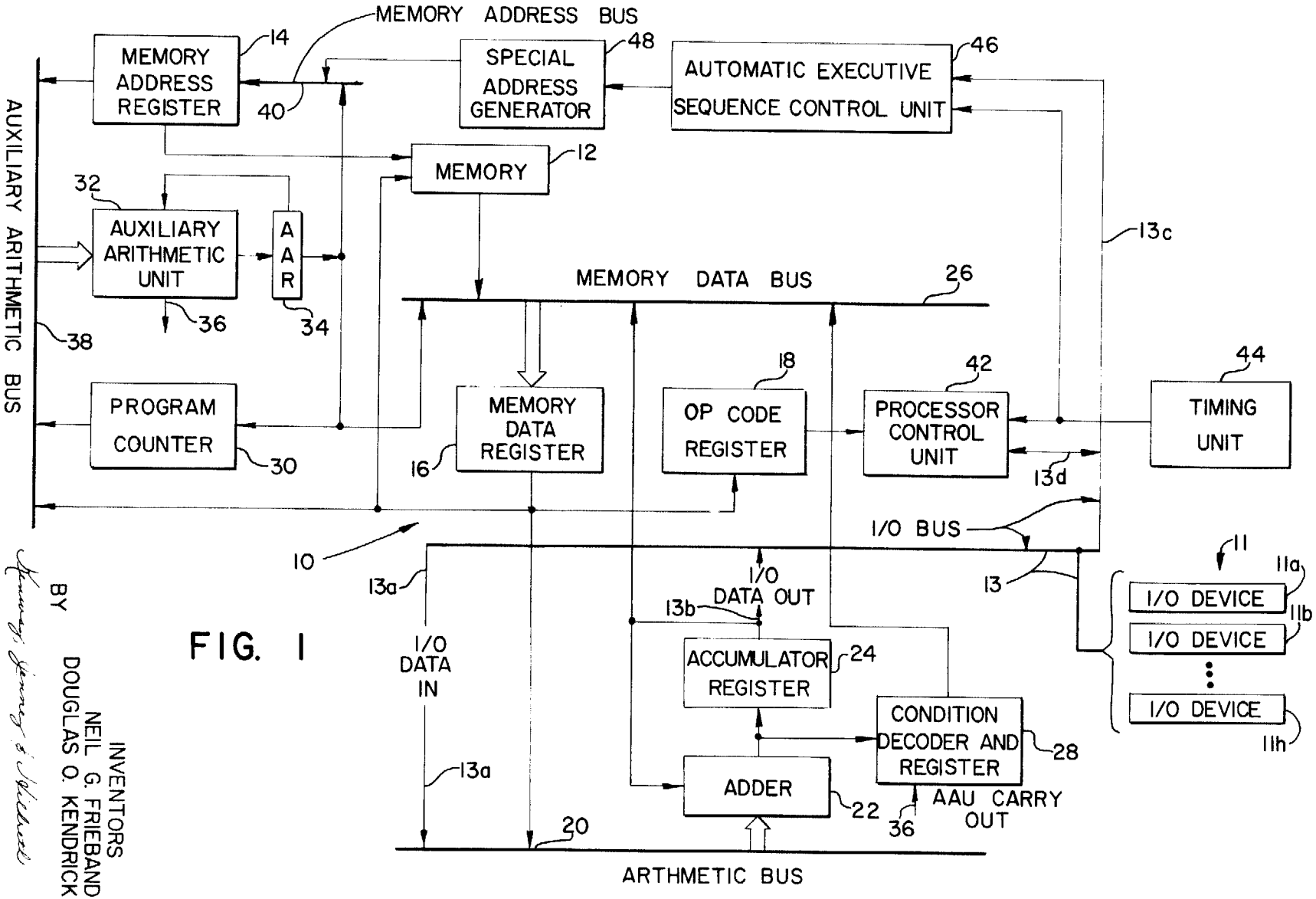
FIG. 1 is a block schematic diagram of an electronic digital data processor embodying the invention and connected with a group of I/O devices.

FIG. 1 shows an electronic digital data processor 10 illustrating the practice of the invention. The processor has a random access addressable core memory 12 which receives address signals from a memory address register 14. The memory 12 is connected to read information into a memory data register 16 by way of a memory data bus 26, and alternatively write information received from the memory data register. An OP-code register 18 is connected to receive the OP-code of instructions read into the data register. The memory data register 16 also applies information stored therein to an arithmetic bus 20. An adder 22 receives input signals from the bus 20 and applies output signals to an accumulator register 24. The accumulator applies signals to the adder 22 and to the memory data bus 26.

The processor is further illustrated as having a condition decoder and register 28 that receives signals from the adder 22 identifying when the adder has an overflow, when it produces a negative resultant, when it produces a zero resultant, and the like. The condition decoder and register 28 stores the identification of these conditions for application to the memory data bus 26.

The processor of FIG. 1 also has, as shown on the left side of the drawing, a program counter 30 and an auxiliary arithmetic unit 32 with an auxiliary arithmetic register 34. The auxiliary arithmetic unit performs binary arithmetic operations with the numbers applied thereto, and transfers the resultant to the auxiliary arithmetic register 34. The unit 32 can employ a conventional organization of operand selection circuits and a binary adder, and a decoder to sense when the result of an arithmetic operation is all ZEROS. A "carryout" line 36 applies the carryout, sign, and other condition signals from the unit 32 to the condition decoder and register 28 for processing in the same manner as the condition signals from the adder 22.

The conductors of an auxiliary arithmetic bus 38 are connected to receive the contents of the memory address register 14, the program counter 30, and the memory data register 16. The bus 38 can apply these signals to the input terminals of the auxiliary arithmetic unit 32. Thus the contents of the memory address register, program counter, and memory data register can be applied to the auxiliary arithmetic unit 32.

The auxiliary arithmetic register 34 is connected to apply output signals to the program counter 30, and the memory data bus 26, and a memory address bus 40 that feeds the memory address register 14.

The remaining components of the processor shown in FIG. 1 are a processor control unit 42, a timing unit 44, an automatic executive sequence control unit 46, and a special address generator 48. The timing unit 44 applies timing pulses to the control units 42 and 46 of the processor. It also connects with other logic components of the processor as is conventional; these connections are not shown. The processor control unit 42 provides the usual complement of logic gates, flip-flops, and the like for producing the various sequences of control signals that operate the processor components to perform conventional computer operations. Thus unit 42 and the other components of the processor not described in detail hereinafter are available or can be constructed readily by those skilled in the art, particularly in accordance with the flow charts set forth hereinafter.

The automatic executive sequence control unit 46 includes logic circuits that sense and identify interrupting conflict situations. Further, in response to the identification of an interrupting conflict situation, these circuits automatically produce a sequence of control signals that resolves the conflict situation and transfers the processor operation from the instruction sequence in process when the conflict arose to another instruction sequence. The sequence control unit 46 can thus be considered as the part of the processor control unit 42 that provides executive control for the processor, at least in certain situations.

The special address generator 48, which also can be considered as part of the processor control unit 42, generates the addresses of specific locations in the memory 12 which the control unit 46 calls into play in transferring the processor operation from one program to another in accordance with the invention.

FIG. 1 also shows a group of I/O devices 11a, 11b, 11c connected with the processor 10 by way of an I/O (input/output) bus 13. The bus has conductors 13a connected to the processor arithmetic bus 20 and on which the I/O devices send data or other information to the processor. Conductors 13b of the bus, connected in the processor to the accumulating register 24 output, carry data from the processor to the devices. Control conductors 13d carry control signals between the processor control unit 42 and the I/O devices. These conductors include the lines on which the processor sends an actuating signal to a device preparatory to transferring data with the device. The I/O bus also has conductors 13c on which the I/O devices send the processor acknowledge signals responsive to actuating signals, and send interrupt request signals.

The processor control unit 42 and sequence control unit 46 normally maintain the processor in an Instruction State. However, when the sequence control unit 46 detects that an interrupting conflict is present, it commences a sequence of automatic executive steps and switches the processor out of the Instruction State into a series of Extension States. The processor operation proceeds under control of the Extension States throughout the automatic executive operation that resolves the interrupting conflict.

Figure 2:
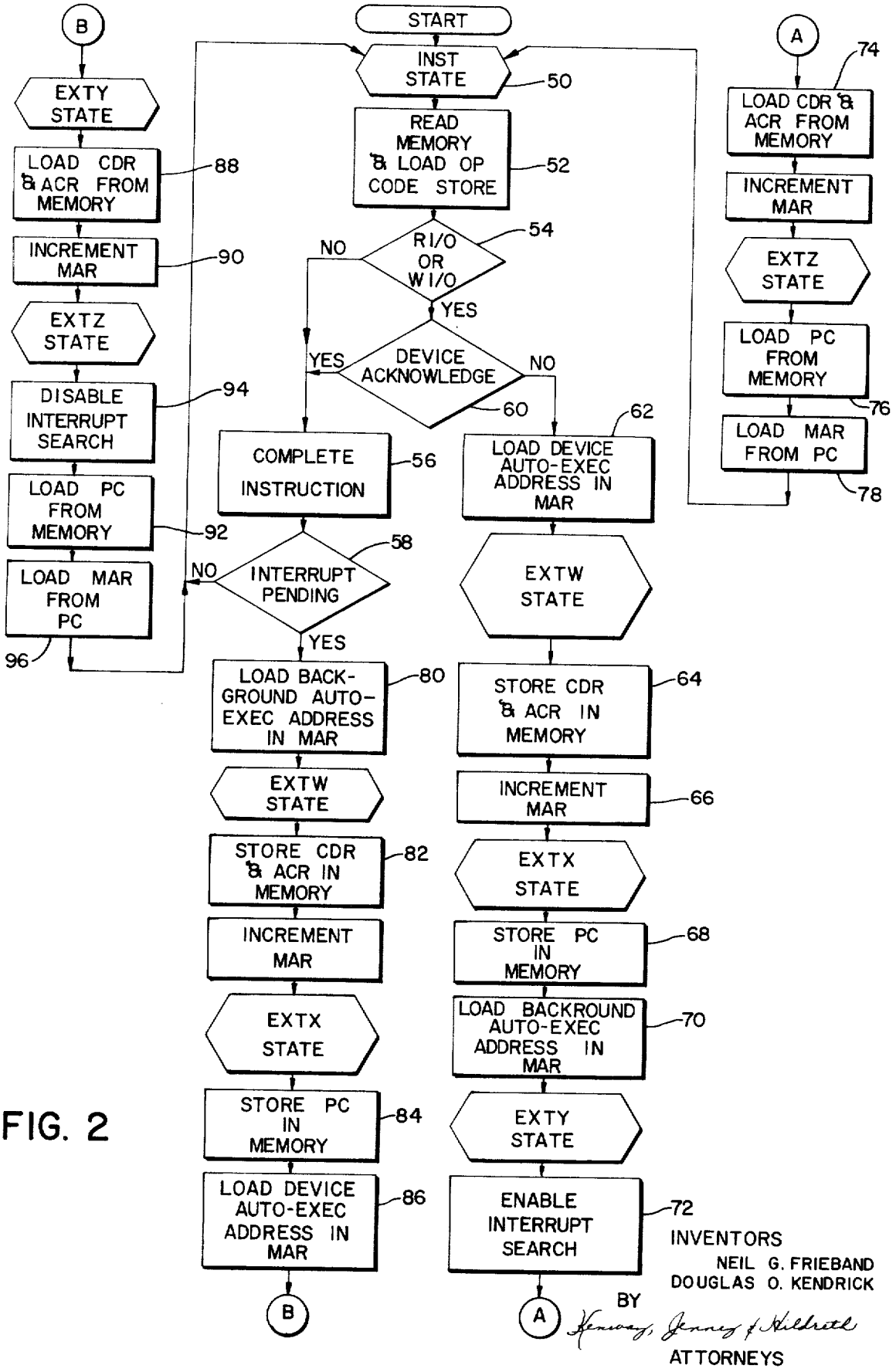
FIG. 2 is a flow chart of the sequence of functional operation with which the processor of FIG. 1 resolves interrupting conflicts in accordance with the invention.

The flow chart of FIG. 2 lists the functional steps involved in this automatic executive operation. The operation commences at the upper center of the drawing at the START location with the processor in the Instruction State, as indicated with state box 50. As indicated with action box 52, the processor reads an instruction from the memory 12 of FIG. 1 and loads it into the memory data register 16 with the operation code being loaded into the OP-code register 18. The processor then senses, as indicated with decision box 54, whether the operation code identifies an I/O transfer instruction, i.e., a read I/O instruction or a write I/O instruction. When the instruction is not an I/O transfer instruction, the processor remains under the control of the processor control unit 42 and completes the instruction, as indicated with the action box 56. Thereafter, as indicated with decision box 58, provided no interrupts are pending, the processor remains in the Instruction State and loops back to action box 52 and reads the next instruction from memory.

On the other hand, when an I/O instruction is read from memory, the processor proceeds from decision box 54 to decision box 60, and after transmitting a request for service to the specified I/O device, awaits the receipt of a timely device acknowledge signal. When the device acknowledge arrives in the alloted time, as indicated with decision box 60, the processor operation proceeds to action box 56 for completing the instruction.

The foregoing operations involve no interrupting conflict situations. However, with further reference to FIG. 2, when the I/O device signaled for service does not transmit a timely device acknowledge signal, the processor operation proceeds from decision box 60 to action box 62. At this point the processor loads into the memory address register 14 (MAR), from the special address generator 48, the address in memory 12 of a location reserved for the I/O device which the I/O instruction identifies. This address is termed an autoexecutive (A–E) device address. Upon completion of this action, the processor switches from the Instruction State to Extension W State, the first of the sequence of Extension States. The action performed with action box 62 is actually part of the autoexecutive operation and could follow the transfer to the Extension States; the illustrated processor follows the indicated sequence merely for time economy resulting from the particular organization of its operating cycles.

With the memory address register storing the address of the A–E device location for the identified I/O device, the processor stores its present status in this memory location and if necessary in adjacent locations. Accordingly, as indicated with action box 64, the processor stores the contents of the condition decoder and register 28 (CDR) and the contents of the accumulator register 24 (ACR) in the designated A–E device location. The processor then increments the address in the memory address register to the adjacent A–E device location, action box 66. After switching from Extension W State to Extension X state, the processor, as indicated with action box 68, stores the contents of the program counter 30 (PC) in this memory location.

Thus, to summarize the flow chart boxes 62–68 briefly, in response to the presence of an I/O instruction and the absence of a device acknowledge signal (decision boxes 54 and 62), the sequence control unit 46 automatically stores the present status of the processor in memory locations reserved for this particular interrupting conflict and for the identified I/O device.

The processor is now ready to transfer operation from the program containing the interrupted I/O instruction to a different background program. The starting status of this program is already stored in the memory 12 in an A–E background location for the designated I/O device. Accordingly, the first step in this transfer, action box 70, is to load the memory address register 14 with this background address, which is produced with the special address generator 48. With this address in the memory address register, the processor proceeds to Extension Y State and, after enabling its interrupt system as indicated with action box 72, loads in the status of the background instruction sequence or program to which it will transfer operation. Thus, as indicated in action box 74, the processor loads into the condition decoder and register 28, and into the accumulator register 24, data read from the autoexec background location. After the memory address register is incremented to the next A–E background location, at which point the illustrated processor advances to Extension Z state, the program counter is loaded from this location, action box 76.

The processor is now ready to operate on the background instruction sequence. Accordingly, the processor loads the address of the first instruction to be performed in the background sequence into the memory address register, from the program counter, as indicated with action box 78. From there, the processor transfers back to the Instruction State, and as indicated with action box 52, reads the first instruction of the background sequence from memory and proceeds to execute it in accordance with the ensuing boxes of the flow chart.

The processor operation of the other interrupting conflict situation shown in FIG. 2 commences when, upon completion of an instruction, an interrupt signal is pending as determined with decision box 58. The presence of the interrupt signal at this juncture actuates the sequence control unit 46 to again store off the present processor status and to load in a program for servicing the recognized interrupt request. However, in contrast to the autoexecutive operation for a missing device acknowledge condition as just described, the sequence control unit stores the present processor status in an A-E background location and loads in the new status from an A-E device location.

In particular, in response to an affirmative condition from decision box 58, the processor proceeds to decision box 80, and loads into the memory address register from the special address generator 48 a background autoexec address associated with the identity of the interrupting I/O device. After switching out of the Instruction State to the Extension W State, the processor stores the current contents of the condition decoder and register and of the accumulator register in this memory location. The memory address register is then incremented to the address of the next A-E background location for the interrupting device, the processor switches to the Extension X State, and the program counter 30 contents are stored in that location, action box 84.

With the information defining the status of the processor, at the point where it recognized the pending interrupt signal, retained in the memory background locations assigned to the interrupting I/O device, the processor services the interrupt signal by first loading the memory address register from the special address generator 48 with the autoexec device address for the interrupting device. The processor, now in Extension Y State, stores in its condition decoder and register 28 and accumulator register 24 the information read from this autoexec device address, action box 88. The processor next increments the memory address register to the next autoexec device address, action box 90, and loads the program counter 30 with status information previously stored in that location, action box 92. At this point, action box 94, the illustrator processor also disables the interrupt search so that it will not respond to further interrupt signals.

The final step in the automatic executive operation initiated by an interrupt signal is to transfer to the memory address register from the program counter the address of the first instruction of the sequence that will service the interrupting I/O device. This is indicated with action box 96. In most instances, this is the address of an I/O transfer instruction with this I/O device which was not acknowledged at some prior time. Accordingly, the processor is now ready again to initiate the same I/O transfer instruction. From this juncture the processor returns to the Instruction State, and reads the addressed instruction from memory and executes it in the manner indicated in FIG. 2 for the Instruction State.

In further explanation of the foregoing program transferring automatic executive operating of the invention, the following table I identifies the contents of the memory 12 autoexecutive locations assigned to two I/O devices 11a and 11b for an illustrative operating sequence. In this illustration, the two I/O devices use the same background A-E location and two consecutive memory location are reserved for the background status and for device status for each device. When the devices use common background status locations, the processor can recognize interrupts from these devices only when executing background program instructions.

At a time prior to $T_0$, the start of the sequence now to be described, status information for the condition decoder and register and for the a cumulator register and pertinent to executing an I/O transfer instruction at address A were stored in the device 11a No. 1 Device Location, and the device 11a No. 2 Device Location was loaded with address A. Similarly, the device 11b Device Location 1 and 2 were loaded with M entry and M address status information, respectively.

TABLE I

| Memory 12 locations reserved for Automatic Executive Operation | Time $T_0$ | $T_1$ | $T_2$ | $T_3$ |
|---|---|---|---|---|
| Common Background Location No. 1 (CDR and ACR Status) | | X entry | | Y entry. |
| Common Background Location No. 2 (PC Status) | | X address | | Y address. |
| Device 11a Device Location No. 1 (CDR and ACR Status) | A entry | | B entry | |
| Device 11a Device Location No. 2 (PC Status) | A address | | B address | |
| Device 11b Device Location No. 1 (CDR and ACR Status) | M entry | | | |
| Device 11b Device Location No. 2 (PC Status) | M address | | | |

At time $T_0$, the processor has just completed instruction W of a background routine and has incremented the program counter to X, the address of the next instruction in this routine. Before fetching the instruction at location X, the processor detects a pending interrupt, FIG. 2 box 58, from device 11a. In response, the processor stores its current status in the common Background Location. This status information is that the condition decoder and register and the accumulator register store information pertinent to entry into the execution of the instruction at memory location X, and the program counter stores the address X. Accordingly, at Time $T_1$, after the status-saving operations, the Background autoexecutive Location No. 1 contains X entry data and Background Location No. 2 stores address X.

After storing off the X entry and X address information, the processor proceeds to load in the device 11a device status, i.e., the A entry and A address information. This information starts the processor on a routine that services the interrupt signal from device 11a. When, in the course of this routine, no acknowledge signal is received during execution of an I/O instruction at address B, the processor at time $T_2$ stores the B entry and B address status information in the device 11a Device Locations, and returns to the X entry and X address information in the Background Locations.

However, when device 11b presents an interrupt just prior to fetching the next background instruction from address Y, the background status is again stored off in the autoexecutive Background Locations. The processor now, at time $T_3$, loads in the M entry and M address status for device 11a, and proceeds from there.

It will be now appreciated that the processor arrangement shown in FIG. 1 and operating in the manner indicated in the flow chart of FIG. 2 and the foregoing table I transfers operation from one program to another in the event of an interrupting conflict situation without resort to a stored program and with relatively few memory cycles, thus avoiding two generally time consuming operations for a processor. Further, the automatic executive operation of the invention involves only a few elementary computations. The processor attains all of the foregoing operations with the use of only a relatively small number of locations in memory 12.

Figure 3:
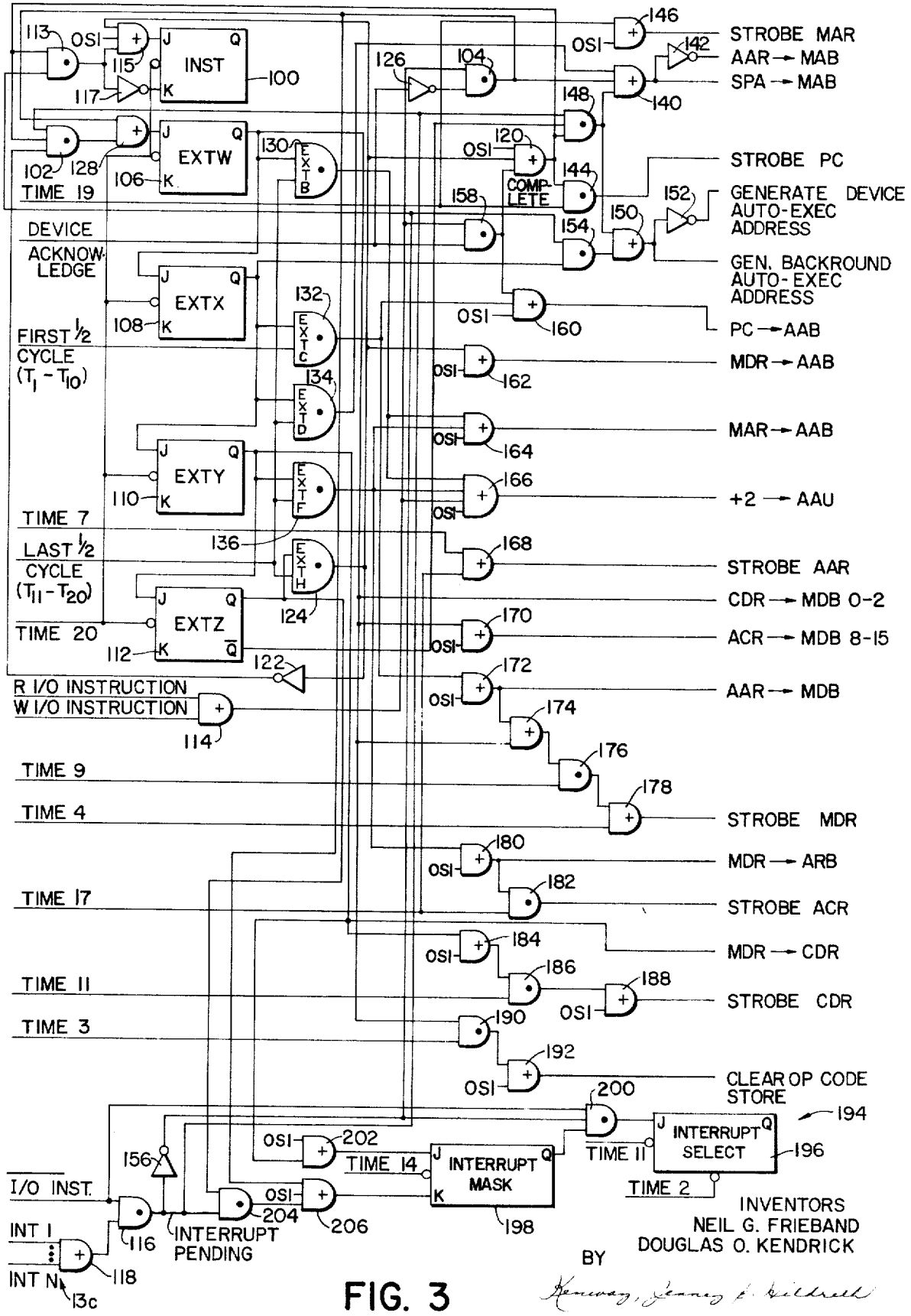
FIG. 3 is a functional logic block diagram of an automatic executive sequence control unit for use in the processor of FIG. 1 in accordance with the invention.

FIG. 3 shows, with English logic, a construction for the automatic executive sequence control unit 46 of FIG. 1 for providing the foregoing program transferring automatic executive operation. The illustrated control unit has an instruction flip-flop 100 that is set when the processor is in the Instruction State. A gate 102 (FIG. 3 upper left) makes the interrupt-pending decision indicated in FIG. 2 decision box 58 and a further gate 104 (FIG. 3 upper middle) makes the device acknowledge-sensing decision shown in FIG. 2 decision box 60. An assertive output from either gate intiates the transfer of the processor operation to the autoexecutive performing Extension States. A register of flip-flops 106, 108, 110 and 112 maintains the processor in the Extension W, X, Y and Z States respectively. The sequence control unit further has a logic network of AND, OR, and inverter gates that operates with the gates 102 and 104 and the extension flip-flops for producing the individual gating signals with which the processor executes the operations listed in FIG. 2. The flip-flops illustrated in FIG. 3 are of the so-called J–K type, which are of conventional design and construction.

The input signals to the sequence control unit 46 are listed at the left side of FIG. 3. These include a common device acknowledge signal from the FIG. 1 group 11 of I/O devices. The sequence control unit also receives a read I/O instruction signal and a write I/O instruction signal, produced from the contents of the OP-code register 18 of FIG. 1, and receives a NOT-I/O instruction signal, also produced in response to contents of the OP-code register 18. Other inputs to the sequence control unit are the individual interrupt signals, INT 0, INT 1, ... INT 7, one from each of eight I/O devices, on lines 13c of the I/O bus 13. Finally, the sequence control unit receives numerous timing signals from the timing unit 44 as indicated; there also are two timing signals, designated first half-cycle and second half-cycle, each of which persists through one-half of the illustrated 20 timing-pulse cycle.

The sequence control unit produces gating and strobe signals as appear along the right side of FIG. 3. By way of example, a gating signal such as SPA → MAB applies a special address from the special address generator 48 of FIG. 1 to the memory address bus 40. A concurrent Strobe MAR signal loads the memory address register with the signals applied to the register inputs, which are seen in FIG. 1 to come from the bus 40.

The logic organization of the FIG. 3 control unit is now described in detail. With regard to the Instruction State flip-flop 100, in response to concurrent receipt of a signal indicating that the processor has completed an instruction and a signal indicating that an interrupt is not pending, and AND-gate 113 produces an assertive output signal. (The coincidence of these signals corresponds to a NO output from decision box 58 of FIG. 2.) This signal enables the J input of the flip-flop 100 via an OR-gate 115, and disables the K input, by way of inverter 117. This conditions the flip-flop 100 to switch to the set state in response to a timing pulse 20, applied to the clock input of the flip-flop. Other inputs to the OR-gate 115 also condition the flip-flop to be set; and in the absence of inputs to the OR gate, the inverter 117 conditions the flip-flop to be reset. The designation in FIG. 3 that a gate receives a signal OS1 means that the gate receives other system input signals. These signals are not pertinent to the automatic executive operation of the invention and are not discussed further.

When the instruction read from memory 12 is not an I/O instruction, an OR-gate 114 receives no assertion signals and hence maintains the "I/O acknowledge" AND-gate 104 disabled. In this condition, the presence or absence of a device acknowledge signal has no effect on the processor.

Similarly, the "extension initiating" AND-gate 102 remains disabled so long as an AND-gate 116 (FIG. 3, lower left) does not receive a NOT I/O instruction signal ($\overline{\text{I/O instruction}}$) concurrent with an interrupt signal for any I/O device. An OR gate 118 receives all the interrupt signals on lines 13c to produce this "any interrupt" signal. The other inputs to the extension initiating AND-gate 102, in addition to the signal from AND-gate 116, are a "complete" signal which an OR-gate 120 produces in response to any one of several input signals, and a timing signal which an inverter 122 produces when the processor is not in the last one-half of the Extension Z state cycle.

On the other hand, when the OR-gate 114 receives a signal identifying that an I/O instruction has been read from the memory 12, the I/O acknowledge gate 104 is enabled. In this condition, the gate produces an assertive output signal when the device acknowledge signal is not present, as signalled to the AND-gate 104 with an inverter 126. The resulting signal from the gate 104 is applied to the set or J input of the extension W flip-flop 106 by way of an OR-gate 128. When this signal is present at the J input at the end of a processor operating cycle, i.e., at the time of timing pulse 20, the flip-flop 106 switches to the set state. This places the processor in the Extension W State.

At the same time, the absence of the device acknowledge signal precludes AND-gate 158 from producing an assertive output. Consequently OR-gate 120 is in a negated condition and does not apply an assertive signal to the AND-gate 113 feeding flip-flop 100. As a result, this flip-flop receives an assertive signal only at its K, reset input. Hence the same timing pulse 20 that set the extension W flip-flop, resets the instruction flip-flop. This takes the processor out of the Instruction State.

The set or Q output terminal of the extension W flip-flop 106 is applied to the set input terminal of the next successive extension X, flip-flop 108. The other extension flip-flops are interconnected in like manner. With this arrangement, when the extension W flip-flop is set, it enables the extension X flip-flop to be set by the next timing pulse 20, which occurs at the end of the next processor operating cycle. Thereafter, the extension Y and extension Z flip-flops are set in succession at the end of succeeding processor cycles.

The logic of the sequence control unit is such that the Extension W state flip-flop 106 does not receive an assertive set input signal at the time flip-flop 108 is set. Accordingly, the flip-flop 106 returns to the reset state at the time the flip-flop 108 is set. In this manner, each Extension State flip-flop is set for only a single processor cycle.

Thus, once the processor switches from the Instruction State to the Extension W State, it automatically switches to successive Extension States in succeeding operating cycles. During each Extension State, the set output from the one extension flip-flop in the set state enables gate circuits in the sequence control unit.

In addition to the extension gating levels thus produced at the set output terminal of the extension flip-flops 106, 108, 110 and 112, extension sub state levels are produced currently during selected one-half cycles. For this purpose, the sequence control unit has, as also shown in FIG. 3, an extension B AND-gate 130 that produces an output signal during the last half of a processor cycle when the extension W flip-flop is set. Further, an extension C AND-gate 132 produces an output signal during the first half cycle when the processor is in the Extension X State. Similarly, AND-gate 134 produces a gating level during the latter half of that operating cycle. In the same manner, an extension F AND-gate 136 produces a gating signal during the last half of each Extension Y State cycle, and the Extension H gate 124 produces a gating signal during the last half of the processor cycle when Extension Z flip-flop is set. The output signal from this extension H gate 124 is applied, among other places, to the J input terminal of the instruction flip-flop 100, by way of OR-gate 138. Thus signal conditions the flip-flop 100 to switch to the set state with the last timing pulse 20 in the Extension Z State cycle. It is in this manner that the processor resumes conventional operation in the Instruction State after performing an auto executive operation in accordance with the invention during Extension W, X, Y and Z States.

With further reference to FIG. 3, an OR-gate 140 (upper right) produces one of two gating signals depending on the state of the AND-gate 104, as well as on the states of other gates as shown as discussed below. One addressing gating signal, produced with an inverter 142 when the OR-gate 140 is disabled, is the AAR⟶MAB level used to apply a memory address from the auxiliary arithmetic register to the memory address bus. The other signal, produced with AND-gate 104 is enabled and hence when the processor is performing an automatic executive operation, is the SPA ⟶ MAB level that gates the special address generator 48 of FIG. 1 to apply a special memory address to the memory address bus.

An AND-gate 144, when enabled by OR-gate 120 producing an instruction complete signal, responds to timing pulse 19 to produce the signal that strobes the program counter 30 of FIG. 1 to store whatever signals are applied to its inputs, i.e., which are being gated out from the auxiliary arithmetic register 34. Timing pulse 19 also produces, by way of an OR-gate 146, the gating level that strobes the memory address register 14 to store signals being gated onto the memory address bus 40.

An AND-gate 148 produces an output signal when it coincidentally receives the instruction complete signal from OR-gate 120, a signal indicating that the extension Z flip-flop is not set, and an interrupt pending signal from AND-gate 116. The resultant output signal from the gate 148 is applied to OR-gate 140 and to an OR-gate 150, the output signal from which enables the special address generator 48 of FIG. 1 to generate a background auto executive address. The operation of the address generator 48 in response to this signal is discussed below with reverence to FIG. 4. When the OR-gate 150 does not receive an assertive input signal, an inverter 152 connected to its output terminal produces a signal for generating an autoexecutive device address.

The OR-gate 150 receives as a second input signal the output signal which an AND-gate 154 produces during Extension X State in response to a no interrupt pending signal, produced with an inverter 156 (FIG. 3, lower left) having its input connected to the output of the AND-gate 116.

The device acknowledge signal input to the sequence control unit 46 via the bus 13 is applied, in addition to inverter 126, to an AND-gate 158. The presence of a read I/O or write I/O instruction, as signaled with the OR-gate 114, enables this AND-gate 158 to respond to the device acknowledge signal. The resultant signal from gate 158 is applied as one input to OR-gate 120 and it is also applied to an OR-gate 160 that produces a gating signal PC ⟶ AAB, i.e., for transferring the contents of the FIG. 1 program counter 30 to the auxiliary arithmetic bus 38. The gate 160 also produces this gating level during the first half cycle of each Extension X State.

An OR-gate 162 produces the MDR ⟶ AAB gating signal during the last half of each Extension Z state cycle. Further, an OR-gate 164 produces the MAR ⟶ AAB gating level during the last one-half cycle of an Extension W State and during the last half cycle of an Extension Y State. In like manner, an OR-gate 166 actuates the FIG. 1 arithmetic unit 32 for incrementing the count therein by two in response to the last half cycles of each Extension Y State and each Extension W State, and the presence of an I/O transfer instruction. (The illustrated processor is organized to store two bytes at each memory word location. The memory address is advanced to successive byte locations by incrementing it by a count of one, and this increment-by-two signal increments a memory address in the arithmetic unit to the next word location.) An OR-gate 168 responds to each time 7 pulse and to each time 17 pulse to strobe the auxiliary arithmetic register 34 to accept and store the signals present at the outputs of the arithmetic unit 32.

When the automatic executive sequence control unit 46 is in the Extension W State, the flip-flop 106 set output signal gates the contents of the condition decoder and register 28 to lines 0, 1 and 2 of the memory data bus 26. The same signal actuates an OR-gate 170 to apply the contents of the accumulator register 24 to lines 8 through 15 of the memory data bus. (The illustrated memory 12 can store 16 bits in each location, the bits being numbered 0 to 15. Accordingly, the illustrated memory data register has a 16-bit capacity and the memory data bus has 16 like-numbered lines. Lines 0–7 transfer information with one eight-bit byte of a location and lines 8–15 feed the other byte.)

An OR-gate 172 produces a level for gating the contents of the auxiliary arithmetic register 14 onto the memory data bus 26 in response to the output signal from the extension C gate 132, i.e., during the first one-half of the cycle when the processor is in the extension X state. The signal from gate 172, or the extension W signal from the set terminal of flip-flop 106, actuates an OR-gate 174 to enable an AND-gate 176. The gate 176 then responds to timing pulse 9 to strobe the memory data register to store the signals on the memory data bus 26. This is done by way of an OR-gate 178, which also is actuated to strobe the memory data register with timing pulse 4. The output signal from the extension F gate 136 is passed through an OR-gate 180 to gate the contents of the memory data register onto the arithmetic bus 20 and to enable an AND-gate 182 to respond to time 17 pulse to strobe the accumulator register 24 to read in and store the signals which the adder 22 applies to the adder output terminals.

As also shown in FIG. 3, the gating signal for transferring the contents of the memory data register to the condition decoder and register 28 is produced when the extension Y flip-flop 110 is set, i.e., when the processor is in Extension Y State. This output signal from flip-flop 110 is also applied through an OR-gate 184 to enable an AND-gate 186. The enabled gate then responds to time 11 pulse to strobe the condition decoder and register to accept and store the signals applied to it. An OR-gate 188 produces this strobe signal in response to the signal from the gate 186 in addition to other system inputs. The signal at the set output of the extension W flip-flop 106 when in the set state enables an AND-gate 190 to respond to time 3 pulse to produce, by way of an OR-gate 192 receiving also other systems inputs, a signal for clearing the OP-code register 18 of FIG. 1.

The illustrated automatic executive sequence control unit 46 also includes a further logic circuit indicated generally at 194 in FIG. 3 for selectively enabling and disabling the interrupt inputs to the processor. The illustrated interrupt logic circuit 194 has an interrupt select flip-flop 196 that, when in the set state, produces at its Q output terminal a signal that actuates the I/O devices 11 of FIG. 1 in the order of their interrupt priority to signal the control unit 48, by way of the inputs to the FIG. 3 gate 118, that an interrupt is present. The interrupt logic circuit 194 also has an interrupt mask flip-flop 198 that enables an AND-gate 200 to set the flip-flop 196 only when the flip-flop 198 is set. The other inputs to AND-gate 200 are the interrupt not pending signal from inverter 156 and the NOT I/O instruction signal input to gate 116. With this arrangement, in order for the interrupt select flip-flop 196 to be set, the interrupt mask flip-flop 198 must be set, the instruction being executed must not be an I/O instruction, and there must not be some other interrupt signal pending. When these three conditions coincide, the next timing pulse 11 switches the flip-flop 196 to the set state.

The input signals to the interrupt mask flip-flop 198 include the set output signal from the extension Y flip-flop 110, which is applied to the flip-flop 198 set input terminal by way of an OR-gate 202, and AND-gate 204 applies an output signal to the reset input by way of an OR-gate 206 in response to the coincidence of an interrupt pending signal from gate 116 and the set output from the extension Z flip-flop 112. Another input signal to the OR-gate 206 is the I/O not acknowledge signal output from the gate 104.

The illustrated processor of FIG. 1 operates with a memory address word of 12 bits, decimally numbered from right to left from 0 to 11. Where the group 11 of I/O devices in FIG. 1 use the same autoexecutive background location and hence a common background program, the special address generator 48 (FIG. 1) needs to produce only a single background address, in addition to a single device address for each I/O device. Where the background or device status information requires more than a single location in memory, as above, the address of each such location after the first can be produced by incrementing the address obtained from the address generator. The following table II lists illustrative memory addresses for the first background location and the first device location for the group of eight devices in FIG. 1.

TABLE II

| AUTO EXECUTIVE ADDRESSES | |
|---|---|
| 1 1 1 1 1 1 1 1 1 0 0 0 | First Background Location |
| 1 1 1 1 1 1 1 1 0 0 0 0 | First Device 0 Location |
| 1 1 1 1 1 1 1 0 1 1 0 0 | First Device 1 Location |
| 1 1 1 1 1 1 1 0 1 0 0 0 | First Device 2 Location |
| 1 1 1 1 1 1 1 0 0 1 0 0 | First Device 3 Location |
| 1 1 1 1 1 1 1 0 0 0 0 0 | First Device 4 Location |
| 1 1 1 1 1 1 0 1 1 1 0 0 | First Device 5 Location |
| 1 1 1 1 1 1 0 1 1 0 0 0 | First Device 6 Location |
| 1 1 1 1 1 1 0 1 0 1 0 0 | First Device 7 Location |

Figure 4:
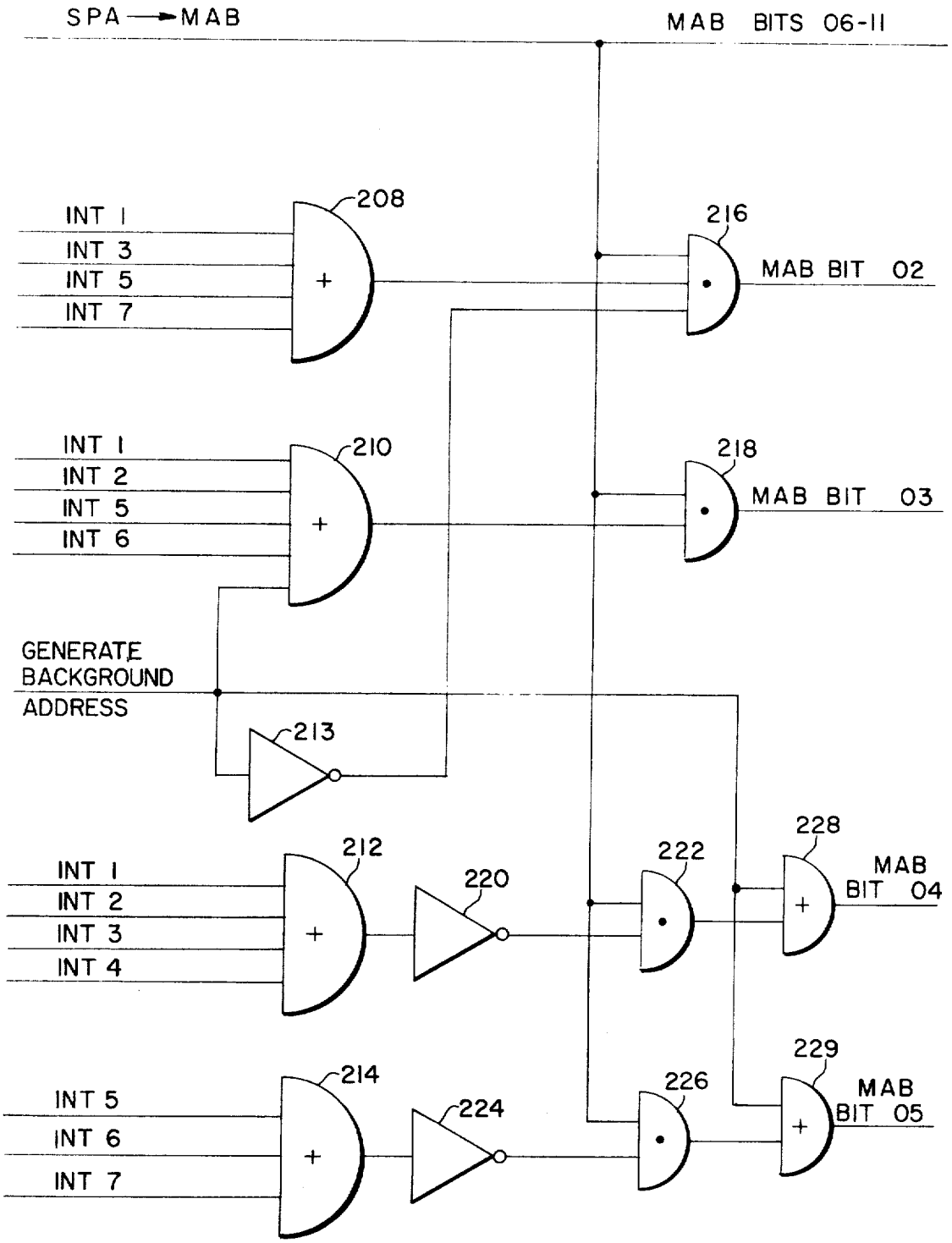
FIG. 4 is a functional logic block diagram of a special address generator for use in the processor of FIG. 1.

FIG. 4 shows a construction of the special address generator 48 for producing the special address words listed in table II. The generator circuit has four input OR-gates 208, 210, 212 and 214 that receive different ones of the interrupt lines from the I/O devices 11a, 11b, etc. The output signals from the OR-gates 208, 210, 212 and 214 are applied respectively to an AND-gate 216, to an AND-gate 218, to an inverter 220 that feeds an AND-gate 222, and to an inverter 224 that feeds a further AND-gate 226. The output signal from the gate 216 is bit 2 of the memory address word, and bit 3 of the word is produced with the AND-gate 218. An OR-gate 228 produces bit 4 of the memory address word in response to either the signal from AND-gate 222 or the gating signal for generating a background auto executive address. This gating signal also produces bit 5 of the memory address word, by way of an OR-gate 229 that also receives the output signal from AND-gate 226. The SPA ⟶ MAB gating signal is applied to the AND-gates 216, 218, 222 and 226 and is also used to produce bits 6 through 11 of the memory address word.

This arrangement of the address generator 48 does not use the Generate Device Address gating signal which the FIG. 3 control unit produces. Also, it technically allows the Generate Background Address signal to produce bits 4 and 5 when the SPA ⟶ MAB signal is absent, but this situation does not in fact present a problem, due to the timing of the signals.

With the address generator of FIG. 4, when only the SPA ⟶ MAB signal is present, only AND-gates 222 and 226 produce assertive output signals. Hence the generator produces the special address 1 1 1 1 1 1 1 1 0 0 0 0. Table II shows that this is the address for the first Device O Location. When the Generate Background Address signal is also present, AND-gate 218 also is active, and the resultant address is that of the first Background Location: 1 1 1 1 1 1 1 1 1 0 0 0. The generator circuit of FIG. 4 produces the other special addresses of table II in like manner.

Figure 5A:
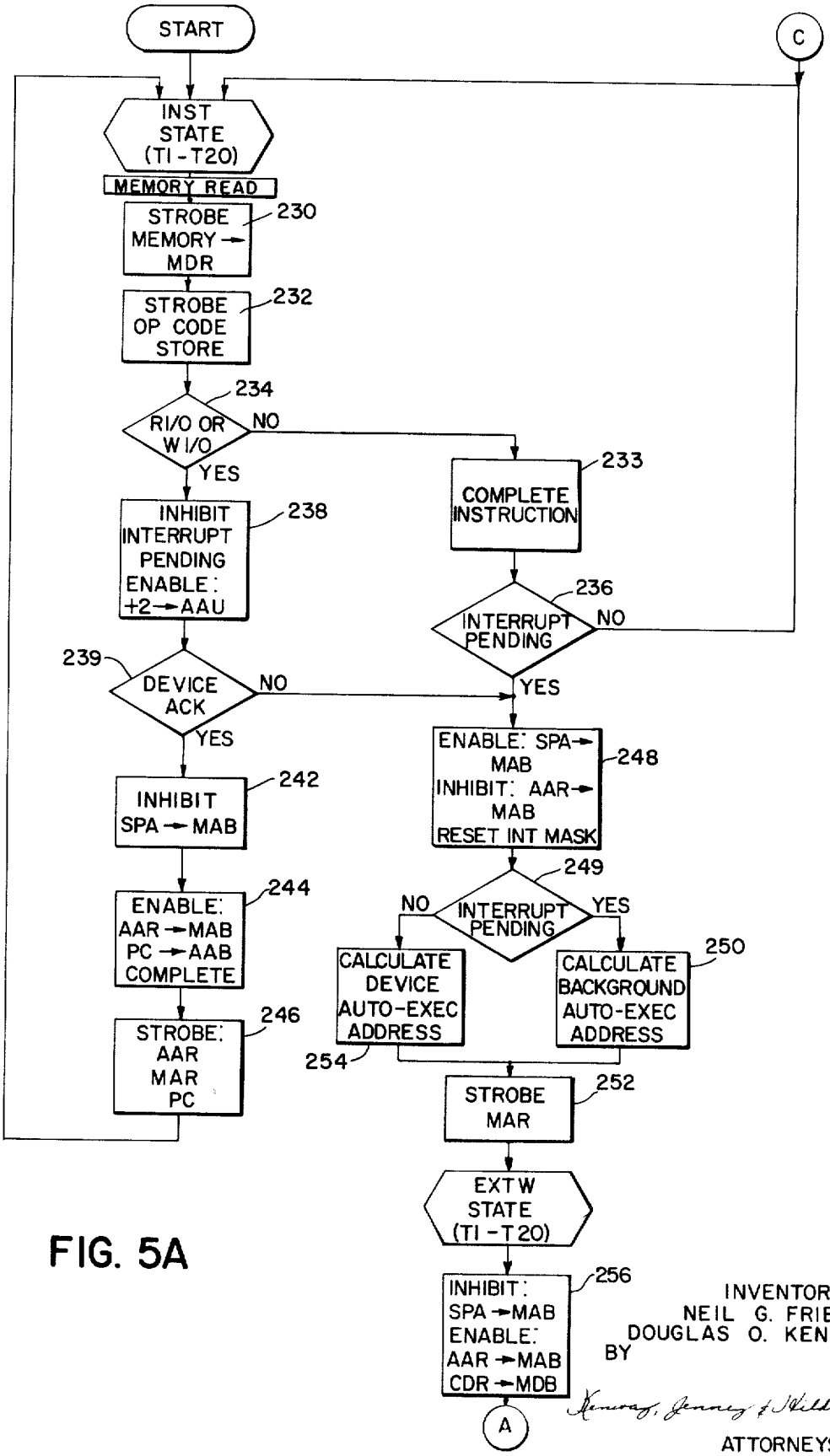
FIGS. 5A and 5B comprise a flow chart of the automatic executive operation of the processor of FIG. 1 with the sequence control unit of FIG. 3.
Figure 5B:
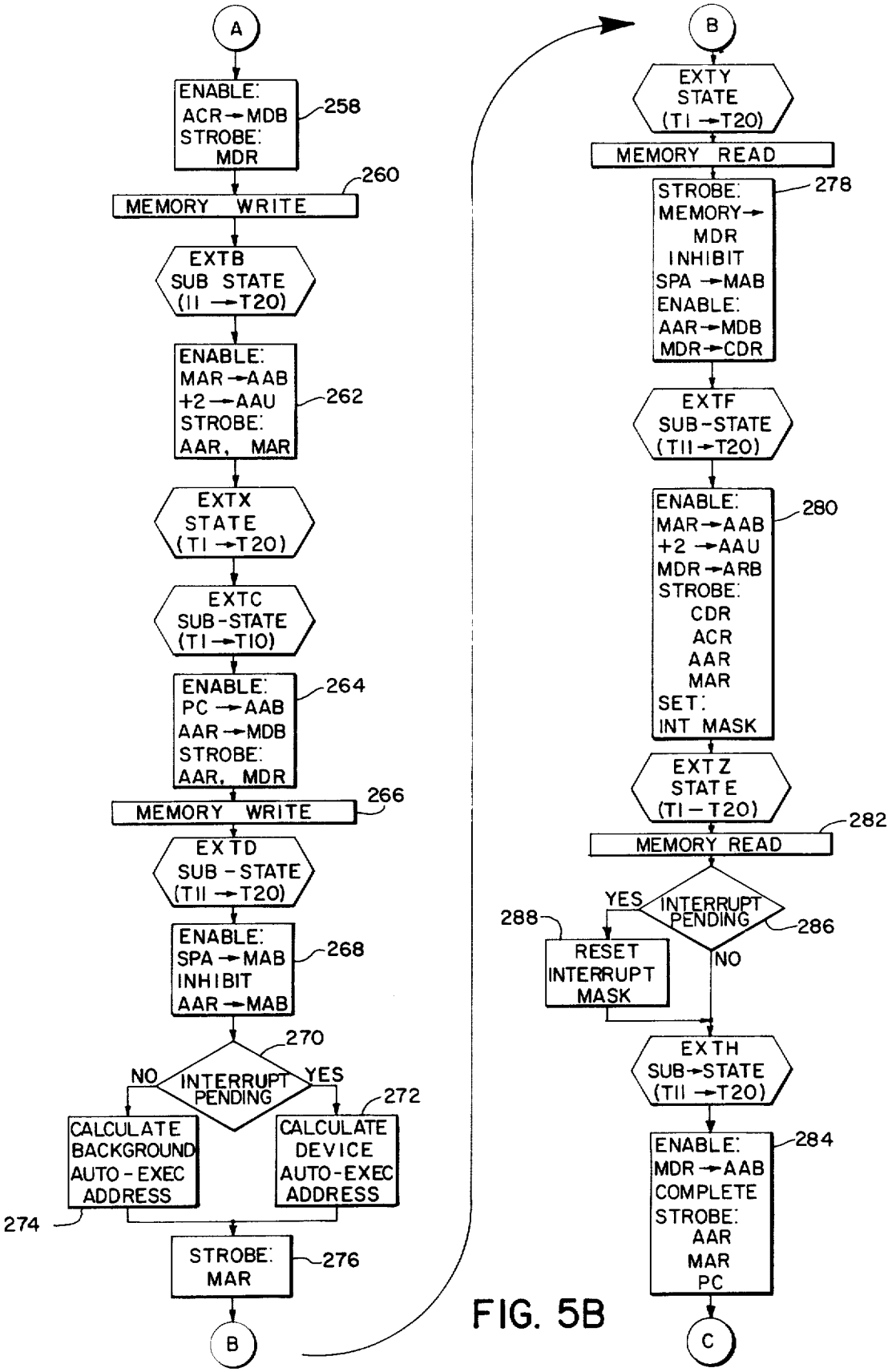

Turning to FIG. 5, it shows the operating sequence of FIG. 2 in further detail for operation with the specific automatic executive sequence control unit of FIG. 3.

Commencing at the start of the FIG. 5 flow chart, the processor is in the Instruction State for a full operating cycle of 20 time pulse intervals. In this cycle, the processor performs a read memory operation with the memory address stored in the memory address register and, per action boxes 230 and 232, loads the instruction word read from memory into the memory data register, with the OP-code portion being loaded into the OP-code register. When the instruction does not call for a read or a write I/O operation, decision box 234, the processor completes the instruction, action box 233. Further, in the event no interrupts are pending upon completion of the instruction, decision box 236, the processor remains in the Instruction State for another cycle of operation.

It is the FIG. 3 OR-gate 114 that determines whether the instruction calls for a read I/O or write I/O operation, decision box 234; and the FIG. 3 gates 116 and 118 in effect perform the interrupt pending decision of box 236.

When the instruction calls for an I/O transfer operation so that the decision box 234 answer is yes, the processor inhibits the interrupt pending signal, action box 238, by inhibiting the setting of the interrupt select flip-flop 196 (FIG. 3) so that no more interrupt requests arise. This action results from the absence of a NOT I/O instruction signal, which is applied to the AND-gate 200 at the input of this flip-flop. The processor proceeds to action boxes 242, 244, and 246 provided it receives a timely device acknowledge signal, decision box 239. The action set forth in these boxes 241–146, with the +2 ⟶ AAU signal produced per action box 238, increments the memory address in the program counter to the next successive word location and loads the incremented address into the memory address register and into the program counter. The logic arrangement of the sequence control unit of FIG. 3 is such that the SPA ⟶ MAB signal that would load the memory address register with a special address from the address generator 48 is not produced; flow chart action box 242 indicates the signal as being inhibited.

In particular, by way of the +2 ⟶ AAU, and PC ⟶ AAB signals, the memory address word in the program counter is applied to the memory address unit 32 and incremented by two. The AAR ⟶ MAB and Strobe AAR, MAR and PC signals transfer the incremented address through the auxiliary register 34 and load in into register 14 and counter 30.

At the same time, although not detailed in the FIG. 5 flow chart for simplicity, the processor executes the I/O instruction. Also, per box 244, the sequence control unit produces a "Complete" signal. The processor then sequences back to the beginning of the next cycle, still in the Instruction State.

The processor also performs the foregoing address-incrementing operations when it completes an instruction by way of action box 233.

In the event that either an interrupt is pending upon completion of an instruction or a device acknowledge signal is not received, the processor proceeds to action box 248 rather than execute another cycle in the Instruction State. As indicated, at this juncture, the sequence control unit of FIG. 3 produces the SPA ⟶ MAB gating signal for transferring an auto executive address to the memory address bus, in lieu of the next successive address after the one currently in the program counter. Also, by resetting the interrupt mask flip-flop 198, the processor precludes the I/O devices from raising further interrupt request signals; however, any interrupt signals previously raised remain present.

When there is such a previously raised interrupt signal pending at this juncture, decision box 249, the processor proceeds to action box 250 and produces, with the special address generator 48 of FIG. 4, an auto executive background address that is strobed into the memory address register, action box 252. Alternatively, if no interrupts are pending per decision box 249, the processor calculates an auto executive device address, action box 254, and loads that address into the memory address register per action box 252.

The illustrated processor with the sequence control unit 46 of FIG. 3 performs the foregoing actions during the single processor cycle in which the instruction is read from the memory 12, action box 230. The last timing pulse, number 20, in this operating cycle switches the FIG. 3 extension W flip-flop 106 to the set state. This transfers the processor from operating in the Instruction State to operation in the first Extension State.

As designated in the FIG. 5 flow chart in action box 256 with the designation Inhibit SPA ⟶ MAB, the FIG. 3 logic of the sequence control unit does not produce this special address gating signal. It is not needed because the autoexecutive address calculated as per box 250 or 254, as the case may be, has already been loaded into the memory address register, box 252. However, at this juncture, box 256, the illustrated sequence control unit takes the first step in incrementing this auto executive address to the next word location by producing the AAR ⟶ MAB gating level.

Also, the sequence control unit produces the CDR ⟶ MDB signal, and as indicated in decision box 258, the ACR ⟶ MDB signal, for applying the present contents of the condition decoder and register and of the accumulator register to the memory data bus. The Strobe MDR signal, box 258, loads this information into the memory data register. The ensuing memory write operation, box 260, stores the status information from these two registers in the autoexecutive location whose address is in the memory address register.

With the status of the condition decoder and register and of the accumulator register stored off in an auto executive location, the sequence control unit proceeds to action box 262. In response to the signals indicated, the memory address register applies the auto executive address to the auxiliary arithmetic bus and, with the +2 increment of the auxiliary arithmetic unit enabled, this unit increments the auto executive address by two to the next word location and applies the incremented address to the auxiliary arithmetic register 34. With the AAR ⟶ MAB level still present, per box 256, the Strobe AAR and Strobe MAR signals transfer the incremented address through the register 34 to the memory address register 14.

As further shown in FIG. 5, the processor sequence control unit advances to the extension X state and in the first half thereof, i.e., extension C sub state, loads the memory address word in the program counter into the memory data register for the purpose of saving this item of status information in the auto executive location whose address is currently in the memory address register. The signals shown in action box 264 provide this action and the ensuing memory write operation loads the program counter status information from the memory data register into the addressed location of the memory 12.

The sequence control unit has now finished storing off the status of the processor at the time the interrupting conflict situation identified with decision box 234 or 236 arose. The control unit is ready to load into the processor status information for commencing the program that will resolve the conflict situation. Accordingly, in the last half of the operating cycle during which the processor is in the Extension X State, the sequence control unit sets up the gating for loading the memory address register with a new address from the special address generator 48, action box 268. Next, depending on whether the conflict situation being handled involves a pending interrupt or an absent device acknowledge signal, as determined per decision box 270, the sequence control unit advances to either action box 272 or 274 to calculate the appropriate auto executive address. After this address is loaded into the memory address register, per action box 276, the sequence control unit advances to the Extension Y State. In this state, the Strobe Memory ⟶ MDR signal indicated in action box 278 follows a memory read operation and transfers the information read from the memory to the memory data register. The MDR ⟶ CDR level and Strobe CDR signal, produced at this time, per boxes 278 and 280, transfer the condition decoder and register portion of this information to that register. The accumulator register is also loaded with new status information at this time by way of the MDR ⟶ ARB And Strobe ACR signals, action box 280.

As also indicated in action box 278, the sequence control unit does not produce the gating signal for loading a special address into the memory address register by way of the memory address bus. Instead it enables the contents of the auxiliary arithmetic register 34 to be applied to this bus for use in the last half of this processor cycle. That is, with reference to box 280, the MAR ⟶ AAB and +2 ⟶ AAU gating signals apply the auto executive address currently in the memory address register to the auxiliary arithmetic bus, increment it by two to the next autoexecutive word location, and load it into the arithmetic unit 32. From there, the incremented address is transferred, by way of the Strobe AAR and Strobe MAR signals, to the memory address register. Thus at this juncture the memory address register contains the address in memory of the second auto executive location from which status information is to be read for loading into the program counter.

The processor performs this operation with the memory read operation, box 282, and with the signals the sequence control unit produces as shown in action box 284. In particular the MDR ⟶ AAB signal transfers the program counter status information read from memory from the memory data register to the auxiliary arithmetic bus, and the Strobe AAR signal applies it to the auxiliary arithmetic register. From there, the new program counter status information is transferred into the memory address register and into the program counter in response to the Strobe MAR and Strobe PC signals. Thus upon completion of the actions shown in box 284, the memory address for the first instruction in the routine to which the processor is being routed is contained in the memory address register and in the program counter.

As also indicated in box 280, the sequence control unit sets the interrupt mask flip-flop 198 during the last half of the operating cycle in Extension Y State. This conditions the FIG. 3 interrupt logic circuit 194 to signal the I/O devices to raise new interrupt request signals during the last half of the next processor-operating cycle, provided the processor is not currently operating in response to an interrupt request. The sequence control unit tests for this condition during the first half of the next cycle, in Extension Z State, as indicated with decision box 286 and with the FIG. 3 AND-gate 204. When there is no interrupt currently pending, this gate is inactive and the sequence control unit proceeds directly to action box 284 during which time the interrupt select flip-flop 196 is set to condition the I/O devices to transmit interrupt request signals. In the next operating cycle, with the processor in the Instruction State, the sequence control unit tests for the presence of new interrupt requests and takes the appropriate action. On the other hand, when the sequence control unit is already servicing an interrupt request, as indicated with a YES result from decision box 286, the control unit proceeds to action box 288 prior to action box 284. The box 288 action resets the FIG. 3 interrupt mask flip-flop 298; this results from AND-gate 204 being active and applying a signal to the reset, K, input of flip-flop 198, by way of OR-gate 206.

The processor then returns to the Instruction State and commences with an instruction fetch operation in which it reads from memory and loads into the memory data register, per action box 230, the first instruction of the routine to which the sequence control unit has just transferred the processor. The further operation of the processor proceeds as indicated in FIG. 5.

It should be understood that the sequence control unit shown in FIG. 3 operates with the same set of auto executive background locations for all the I/O devices in the group 11, FIG. 1. This requires that the processor be operating on a background before it can respond to an interrupt signal. Where this operation is impractical, the processor can be provided with auto executive locations in the memory 12 for each I/O device, just as it is provided with separate auto executive device locations. The construction and operation of the processor in this manner is considered to be fully within the scope of this invention.

Aside from the enabling and inhibiting of interrupt request signals stemming from the use of common background memory locations for the FIG. 1 group of I/O devices as discussed above, the circuits and operation for interrupt signals described herein are illustrative.

It will thus be seen that the objects set forth above, among those made apparent from the preceding description, are efficiently attained. Since certain changes may be made in the above constructions and in carrying out the foregoing operation without departing from the scope of the invention, it is intended that all matter contained in the above description, or shown in the accompanying drawings shall be interpreted as illustrative, rather than in a limiting sense.

It is also to be understood that the following claims are intended to cover all of the generic and specific features of the invention herein described and all statement of the scope of the invention in which, as a matter of language, might be said to fall therebetween.

Having described the invention what is claimed as new and secured by Letters patent is:

1. A digital data processor for fetching and executing stored program instructions, some of which call for a transfer of digital information with any specified one of plural data processing devices capable of operation asynchronously of the processor, and having status components that store information identifying the operative status of the processor and an addressable memory element, said processor further having the improvement comprising A. logic gate means for determining the presence of an interrupt-request signal from an identified one of said devices, and for determining the absence of a device-ready signal from an identified one of said devices, B. logic switch means 1. normally operative in a first state for maintaining said processor in an instruction-executing state for the execution of programmed instructions, and 2. responsive to any one of said determinations from said gate means for switching from said first state to a second state for maintaining said processor in an executive state for transferring operation from one sequence of instructions to another, and C. sequence control means 1. connected with said gate means and with said switch means,
2. rendered in a first condition when said switch means is in said first state and in a second condition when said switch means is in said second state,
3. responsive to an interrupt determination by said gate means to assume said second condition and successively
   a. write the contents of said processor status components into said memory element at a first location the address of which is associated with said identified device,
   b. read previously stored status information from said memory element at a second location the address of which is associated with said identified device and load it into said processor status components,
   c. condition said switch means to switch from said second state to said first state, and
4. responsive to a device-ready absence determination by said gate means to assume said second condition and successively
   a. write the contents of said processor status components into said memory element at [a] *said* second location [the address of which is associated with said identified device],
   b. read previously stored status information from said memory element at [a] *said* first location [the address of which is associated with said identified device] and load it into said processor status components, and
   c. condition said switch means to switch from said second state to said first state.

2. A processor as defined in claim 1 in which said status components include program counter means, arithmetic condition status register means, and accumulator status register means.

3. A processor as defined in claim 1 further including address signal producing means producing said first and said second memory addresses associated with each said device in response to said determination from said gate means and the device identification.

4. A processor as defined in claim 3

A. in which at least some of said data processing devices are organized in a first group, and B. in which said sequence control means includes logic elements for operating said address means to produce a memory address identifying the same first memory location in response to an interrupt determination from any device in said first group thereof.

5. A processor as defined in claim 4 in which said logic elements of said sequence control means operates said address signal producing means to produce a memory address identifying a different second memory location in response to a device-ready absence determination from any device in said first group thereof.

6. A processor as defined in claim 5 in which said sequence control means includes further logic elements for inhibiting said devices from raising new interrupt request signals during the execution of information transfers with said devices.

7. A processor as defined in claim 5 in which said further logic elements of said sequence control means enable said devices to send new interrupt-request signals to said processor only upon the completion of an instruction and upon the completion of an operation with said logic switch means in said second state.

8. A processor as defined in claim 1 further comprising logic elements for maintaining said logic switch means in said first state during an information-transferring operation with one of said devices in response to a device ready-indicating signal from said device.

9. A processor as defined in claim 1

A. which further operates to signal an identified device for a signal-transferring operation therewith, and B. further including gate means maintaining said logic switch means in said first state in response to a timely ready-indicating signal from said identified device signaled for said transferring operation.

10. A processor as defined in claim 1 in which said logic gate means includes logic elements for determining the absence of a device ready signal in response to the coincidence of an instruction calling for a signal transfer with one said device and the absence of a timely ready signal from said device.

11. A processor as defined in claim 1 in which said logic switch means includes logic elements for determining the presence of an interrupt-request signal in response to the coincidence of the completion of the execution of an instruction and the presence of an interrupt request signal from one said device.

[12. A digital data processor for fetching and executing stored program instructions, some of which call for a transfer of digital information with any specified one of plural data processing devices capable of operation asynchronously of the processor, and having status components that store information identifying the operative status of the processor and an addressable memory element, said processor further having the improvement comprising A. logic gate means for determining the presence of an interrupt-request signal from an identified one of said devices, B. logic switch means 1. normally operative in a first state for maintaining said processor in an instruction-executing state for the execution of programamed instructions, and
2. responsive to said determination from said gate means for switching from said first state to a second state for maintaining said processor in an executive state for transferring operation from one sequence of instructions to another, and C. sequence control means 1. connected with said gate means and with said switch means,
2. rendered in a first condition when said switch means is in said first state and in a second condition when said switch means is in said second state,
3. responsive to said interrupt determination by said gate means to assume said second condition and successively a. write the contents of said processor status components into said memory element at a first location the address of which is associated with said identified device, b. read previously stored status information from said memory element at a second location the address which is associated with said identified device and load it into said processor status components, and c. condition said switch means to switch from said second state to said first state.]

[13. A digital data processor for fetching and executing stored program instructions, some of which call for a transfer of digital information with any specified one of plural data processing devices capable of operation asynchronously of the processor, and having status components that store information identifying the operative status of the processor and an addressable memory element, said processor further having the improvement comprising A. logic gate means for determining the absence of a device-ready signal from an identified one of said devices, B. logic switch means 1. normally operative in a first state for maintaining said processor in an instruction-executing state for the execution of programmed instructions, and 2. responsive to said determination from said gate means for switching from said first state to a second state for maintaining said processor in an executive state for transferring operation from one sequence of instructions to another, and C. sequence control means 1. connected with said gate means and with said switch means, 2. rendered in a first condition when said switch means is in said first state and in a second condition when said switch means is in said second state, 3. responsive to said device-ready absence determination by said gate means to assume said second condition and successively a. write the contents of said processor status components into said memory element at a second location the address of which is associated with said identified device, b. read previously stored status information from said memory element at a first location the address of which is associated with said identified device and load it into said processor status components, and c. condition said switch means to switch from said second state to said first state.]

14. Sequencing and gating means for providing automatic executive operation in a stored-program, digital data processor operating with devices that operate at least partially asynchronously of the processor, the processor having components that contain the operative status of the processor and having a memory element, said sequencing and gating means comprising A. conflict-determining first gate means for determining

*i.* the occurrence [and identity] of a conflict condition for said processor in connection with the operation thereof with at least one of said devices,

*ii. the identity of such device, and*

*iii. the kind of such conflict condition from at least first and second kinds thereof,*

B. processor-state register means operating in a first state for conditioning said processor to fetch and execute instructions and operating in a second state for conditioning said processor for said automatic execution operation, and assuming said second state when it receives signals responsive to conflict determinations from said first gate means. [and]

*C. memory address generating means responsive to the determination by said first gate means of the occurrence of a conflict condition and of the identity of such device for producing first and second addresses identifying first and second memory element locations, respectively, assigned to the identified device, said generating means producing said memory addresses identifying the same two locations for either of said first and second kinds of conflict conditions, and*

[C.] *D.* information-transferring second gate means responsive to [a conflict determination] *such determinations* from said first gate means to produce automatically a sequence of gating signals for first storing the contents of said processor status components in [locations in said memory element which are associated with the identity of the determined conflict condition] *said memory element at one of said first and second locations according to said determination of said kind of conflict conditions,* and loading new information into said processor status components from [further locations in said memory element which are associated with said determined conflict condition] *the other of said first and second memory locations.*

[15. Sequencing and gating means as defined in claim 14

A. in which said first gating means identifies one of at least two conflict conditions with any identified one of said devices.

B. further including memory address generating means for producing the address of either of two memory locations assigned to each such device, and C. in which said second gating means and address generating means include logic elements for responding to said determination of a first of said conflict conditions to first produce said first memory address associated with the identified device for storing at said address the contents of said processor status components and then to produce the second of said addresses for said identified device for reading therefrom said new information for said processor status components, and for responding to said determination of the second of said conflict situations to first produce said second address associated with the identified device and then to produce said first address associated with said identified device.]

16. Sequencing and gating means as defined in claim 14

[A. further including memory address generating means for producing the address of either of first and second memory locations assigned to each such device, and] [B.] in which said second [gating] *gate* means and said address generating means include logic elements for producing said first memory address identically for the determination of a conflict condition with any one of a group of said devices and for producing said second memory address differently in response to the determination of a conflict condition with any one of said devices in said group thereof.

17. Sequencing and gating means as defined in claim [16 in which further] *18 comprising further* logic elements [render] *for rendering* said first [gating] *gate* means [responsive to a device-interrupting conflict condition] *able to determine a conflict condition of said first kind* only during the execution of instructions read from [a] *one said* first memory address.

*18. Sequencing and gating means as defined in claim 14 in which said first gate means includes means for determining the occurrence of said first kind of conflict condition in response to an interrupt request originating at a device, and for determining the occurrence of said second kind of conflict in response to the unavailability of a device to transfer information with the processor.*

*19. Sequencing and gating means for providing automatic executive operation in a stored-program, digital data processor operating with devices that operate at least partially asynchronously of the processor, the processor having components that contain the operative status of the processor and having a memory element, said sequencing and gating means comprising*

*A. conflict-determining first gate means for determining the occurrence of a conflict condition for said processor in connection with the operation thereof with at least one of said devices, and for identifying one of at least two conflict conditions with any such device,*

*B. memory address generating means for producing the address of either of two memory locations assigned to each such device,*

*C. processor-state register means operating in a first state for conditioning said processor to fetch and execute instructions and operating in a second state for conditioning said processor for said automatic executive operation, and assuming said second state when it receives signals responsive to conflict determinations from said first gate means, and*

*D. information-transferring second gate means responsive to a conflict determination from said first gate means to produce automatically a sequence of gating signals for first storing the contents of said processor status components in locations in said memory element which are associated with the identity of the determined conflict condition and loading new information into said processor status components from further locations in said memory element which are associated with said determined conflict condition, said second gate means and said address generating means including logic elements*

*i. for responding to said determination of a first of said conflict conditions to first produce said first memory address associated with the identified device for storing at said address the contents of said processor status components and then to produce the second of said addresses for said identified device for reading therefrom said new information for said processor status components, and*

*ii. for responding to said determination of the second of said conflict situations to first produce said second address associated with the identified device and then to produce said first address associated with said identified device.*

*20. A digital data processor for fetching and executing stored program instructions, some of which call for a transfer of digital information with any specified one of plural data processing devices capable of operation asynchronously of the processor, and having status components that store information identifying the operative status of the processor and an addressable memory element, said processor further having the improvement comprising*

*A. logic gate means for determining the presence of each of first and second interrupt signals identifying different interrupt conditions from an identified one of said devices,*

*B. logic switch means*

*1. normally operative in a first state for maintaining said processor in an instruction-executing state for the execution of programmed instructions, and*

*2. responsive to any one of said determinations from said gate means for switching from said first state to a second state for maintaining said processor in an executive state for transferring operation from one sequence of instructions to another, and*

*C. sequence control means*

*1. responsive to a first interrupt signal determination by said gate means to successively*

*a. write the contents of said processor status components into said memory element at a first location the address of which is associated with said identified device, and*

*b. read previously stored status information from said memory element at a second location the address of which is associated with said identified device and load it into said processor status components, and*

*2. responsive to a second interrupt signal determination by said gate means to successively*

*a. write the contents of said processor status components into said memory element at said second location, and*

*b. read previously stored status information from said memory element at said first location and load it into said processor status components.*

* * * * *

UNITED STATES PATENT AND TRADEMARK OFFICE

CERTIFICATE OF CORRECTION

PATENT NO. : RE 28,612

DATED : November 11, 1975

INVENTOR(S) : Neil G. Frieband and Douglas O. Kendrick

It is certified that error appears in the above-identified patent and that said Letters Patent are hereby corrected as shown below:

In the Abstract, line 1, change "process" to --processor--.

Column 2, line 48, change "separation" to --separate--.

Column 3, line 23, after "processor" insert --status for servicing the interrupt is then loaded into the--.

Column 4, line 30, after "remaining" insert --logic--.

Column 6, line 14, change "state" to --State--.

Column 6, line 45, change "state" to --State--.

Column 7, line 68, change "location" to --locations--.

Column 8, line 7, change "a cumulator" to --accumulator--.

Column 9, line 11, change "intiates" to --initiates--.

Column 11, line 17, change "Thus" to --This--.

Column 11, line 60, change "reverence" to --reference--.

Column 15, line 19, change "241" to --242--.

Column 20, line 52, change "programamed" to --programmed--.

Signed and Sealed this

Ninth Day of November 1976

[SEAL]

*Attest:*

RUTH C. MASON
*Attesting Officer*

C. MARSHALL DANN
*Commissioner of Patents and Trademarks*